United States Patent [19]

Stenstrom et al.

[11] 4,100,369
[45] Jul. 11, 1978

[54] DEVICE FOR NUMERICALLY GENERATING A WAVE WHICH IS PHASE MODULATED AND WHICH IS FREE FROM UNWANTED MODULATION PRODUCTS

[75] Inventors: Claude Stenstrom, Palaiseau; Christian Saint-Supéry, Le Chesnay, both of France

[73] Assignee: Compagnie Industrielle des Telecommunications Cit-Alcatel S.A., Paris, France

[21] Appl. No.: 715,965

[22] Filed: Aug. 19, 1976

[30] Foreign Application Priority Data

Aug. 29, 1975 [FR] France .................................. 75 26656

[51] Int. Cl.² .......................................... H04L 27/24
[52] U.S. Cl. ...................................... 178/67; 325/145; 325/163; 332/23 R
[58] Field of Search ............. 178/67; 332/16 R, 23 R, 332/23 A; 325/163, 145

[56] References Cited

U.S. PATENT DOCUMENTS

| 3,597,599 | 8/1971 | Melvin | 178/67 |
|---|---|---|---|
| 3,747,024 | 7/1973 | Choquet | 178/67 |
| 3,935,386 | 1/1976 | Glasson | 178/67 |
| 3,988,540 | 10/1976 | Scott et al. | 178/67 |

Primary Examiner—Robert L. Richardson
Assistant Examiner—Michael A. Masinick
Attorney, Agent, or Firm—Sughrue, Rothwell, Mion, Zinn and Macpeak

[57] ABSTRACT

A digital device has an input for receiving successive samples of input data in digital form representative of phase values $\zeta$. A sequence of the most recent input samples is stored in an input memory. A carrier phase source provides a signal representative of the phase $\theta$ of a carrier wave. A function memory stores values of a function $k_i \cdot \sin(\zeta_{n-i} + \theta_n)$ and is addressed by first selection means which select a group corresponding to a coefficient $k_i$ and second selection means which select a member of the group corresponding to the value of ($\zeta + \theta$). During a calculation period the sum of all values of the function is calculated for $i$ varying between $l$ and a predetermined number $r$. Each such sum forms a sample of the output wave which is converted to analogue form and filtered to remove unwanted sampling components.

7 Claims, 2 Drawing Figures

DEVICE FOR NUMERICALLY GENERATING A WAVE WHICH IS PHASE MODULATED AND WHICH IS FREE FROM UNWANTED MODULATION PRODUCTS

The present invention relates to data transmission. It relates in particular to a digital device for generating a wave which is phase modulated by a data signal and then filtered.

Data signals are often transmitted through a telephone network, for example, by means of a carrier wave whose phase is modulated by the introduction, at particular instants, of phase jumps characteristic of the data to be transmitted.

It is a known practice to use digital techniques for such modulation. It is known, in particular, that it is possible to generate a wave, which is phase modulated by a data signal, by means of a memory in which predetermined sinusoidal values are stored. The reading of the memory is controlled, at regularly spaced instants, by a selector which receives, at each said instant, a signal indicative of the phase of the carrier wave and, as the situation arises, a data item which is significant of a phase jump to be effected. The modulated wave, defined in the form of a sequence of values collected at the output of the memory, is then processed in a band-pass filter which eliminates the modulation residues.

If it is chosen to modulate a carrier wave having zero frequency, as described in French published application No. 2 269 250 (corresponds to UK application No. 17 492/75 and abandoned U.S. application Ser. No. 569,086), it is sufficient to install a digital low-pass filter to eliminate the modulation residues, this filter possibly being of the non-recursive type, i.e. one in which samples of the wave to be filtered are applied to series-connected delay circuits, the delayed samples being multiplied by respective weighting coefficients and then added in an adder which thus delivers the filtered wave in the form of samples. It is nevertheless necessary subsequently to transpose the modulated wave in order to center it about the required transmission frequency.

Preferred embodiments of the present invention make it possible to provide a device for generating a wave which is both phase modulated and filtered, by means of simpler digital equipment. This is made possible by the use of a particular filtering technique which not only avoids using a digital low-pass filter (which are always of complex structure), but also avoids using the transposition mentioned in the above-mentioned application, which transposition requires the processing of two quadrature components of the carrier wave and hence requires the digital circuits to operate at twice the rate.

The present invention provides a device for generating an analogue output wave which is phase modulated by input data and which is free from unwanted modulation products, the device comprising:

an input for receiving successive samples of input data encoded in the form of input phase values $\zeta$ and read by the device at a calculation or sampling frequency F; an input memory for storing the r most recently read input phase values $\zeta_{n-i}$ to $\zeta_{n-r}$; a source of signals representative of carrier phase $\theta_n$; means including a memory and responsive to the stored phase values $\zeta$ and to the carrier phase $\theta_n$ to generate, in each successive calculation or sampling period $T = 1/F$ where $n$ is the number of calculation periods, r functions having the values $k_i \sin(\zeta_{n-i} + \theta_n)$ where $i$ varies from 1 to r, and where $k_1$ to $k_r$ are predetermined coefficients; means for summing the functions generated during each calculation period to provide samples of the output wave to be generated; and smoothing means to derive the analogue output wave from the samples.

In a preferred embodiment of the invention, the calculation frequency is chosen to be four times the frequency of the carrier wave.

Further, in a particular embodiment, the values of the r groups are pre-registered in the memory at addresses each formed by two words, one of which characterizes the group and the other of which characterizes the sinusoidal value concerned, and the selection element comprises two subassemblies one of which is controlled by a clock signal for selecting sequentially, each at the calculation frequency, the r groups and the other of which receives, during each calculation period, the r data items on the modulation phase delivered by the delay line and the data item concerning the phase of the carrier, to select the value to be read in each of the r groups.

A more detailed description of an embodiment of the invention will be given hereinbelow for application to a data transmission at 4800 bits/s in which, according to CCITT recommendations, the data train to be transmitted is divided into groups of three consecutive bits or "tri-bits", and each tri-bit is coded in the form of a phase jump to be introduced in the phase of the carrier wave. This application is, of course, given only by way of an example and has no limiting character.

The description is given by way of example with reference to the accompanying drawing, in which.

Figure 1:
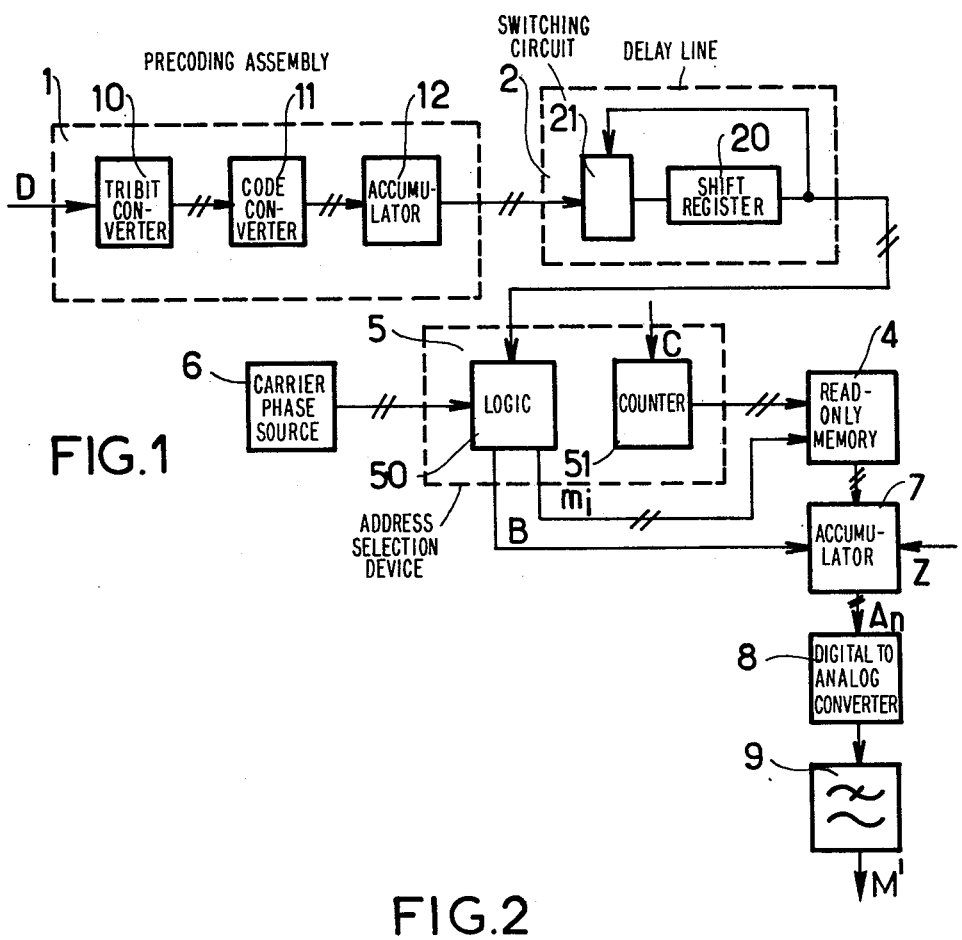
FIG. 1 is a block diagram of modulation equipment for implementing the invention and relating to the above-mentioned application.

In FIG. 1, a binary data train, D, at 4800 bits per second is processed in a device embodying the invention. The device generates a string of digital samples of a wave M (not shown) corresponding to a modulation by phase jumps of a carrier P (not shown) by the train D, the wave M being free from modulation residues. To give a clear idea, the frequency $f$ of the carrier is equal to 1800 Hz.

A pre-coding assembly 1, of known type, receives the train D to determine the successive values of the cumulated sum of the phase jumps to be introduced into the carrier. These values are those which the phase of a wave at zero frequency modulated by the train D would have, and this sum will be designated hereinbelow as the modulation phase $\zeta$. In the assembly 1, the train D is applied to a circuit 10 which is controlled by a clock (not shown) at 4800 Hz in synchronism with the train D, to sample the latter and cut it up into groups of three consecutive bits, or tri-bits, which are delivered at the rate of 1600 Hz. The three bits of each tri-bit are, for example, available in parallel at the output of the circuit 10, this being symbolized by a single line barred by two oblique strokes.

There are eight possible configurations of three bits to which eight values of phase jump must be associated respectively according to the rule: 0, $(\pi/4)$, $2(\pi/4)$ ... , $7(\pi/4)$. In practice, coefficient p is made to correspond to a tri-bit with which the phase jump $p(\pi/4)(0 \leq p \leq 7)$ is associated. This correspondence is obtained in a conventional manner in a code converter 11 which therefore delivers, in response to each tri-bit coming from the circuit 10, the value, coded on three bits, of the required coefficient p. A storage cell 12 is connected to the code converter 11 and determines the value of the modulation phase $\zeta$ by accumulating (mod 8) the values of the coefficients p supplied to it by the code converter 11. This value $\zeta$ is determined once every 1/1600 sec. and is delivered at the output of the assembly 1 in the form of three bits representative of a multiple of $\pi/4$). The apparatus described so far is known.

The output of the precoding assembly 1 is connected to a delay line 2 driven by a clock (not shown), and the modulation phase $\zeta$ applied to the input of the delay line 2 is sampled at a frequency F, called the calculation frequency, which is advantageously chosen equal to 7200 Hz for a carrier wave at 1800 Hz. The delay line 2 introduces r delays each equal to a calculation period, lasting T=(1/F), so as to store at each calculation period, the r values of the modulation phase $\zeta$ relating to the r preceding calculation periods; r is a predetermined integer the choice of which will be discussed further on. The delay line can be constituted, for example, as has been shown in FIG. 1, by a shift register 20, comprising r stages for storing the r phase values $\zeta$, and whose series output forms the output of the delay line 2 and is connected to in a closed loop to the input of the shift register 20 through a switching circuit 21 which is also connected to the output of the pre-coding assembly 1. The register 20 and the switching circuit 21 operate at the frequency r.F, called the elementary frequency, and the output of the pre-coding assembly 1 is sampled by the circuit 21 at the calculation frequency F. Thus, during each calculation period n.T (n being an integer), the r stored phase values are supplied at the output of the register 20 and all, except the oldest, which is eliminated, are re-registered in the register 20. The register 20 also stores the value of the modulation phase $\zeta$ relative to this period n.T and noted hereinafter as $\zeta_n$. In practice, the values of the modulation phase are delivered by the register 20 in the reverse order of their ages, and the new phase value is registered before the old values are re-registered.

The modulated wave M in digital form is obtained by summing, in an accumulator 7, sets of pre-registered values stored at given addresses in a memory 4. The read out control of the memory 4 is provided by an address selection device 5 having a first input connected to receive the values of the modulation phase $\zeta$ provided by the delay line 2 and a second input connected to receive data significant of the phase of the carrier P during successive calculation periods as provided by a carrier phase source 6. The value of the phase of the carrier during the calculation period n.T will be designated hereinafter as $\theta_n$. In the example considered, where the calculation frequency is equal to four times the carrier frequency $f$, the later phase increases by $(2\pi/4)$ (modulo $2\pi$) from one calculation period to the next.

The values stored in the memory 4 constitute r groups each corresponding to the same given set of q sinusoidal values $a_1, \ldots, a_q$, respectively multiplied by r predetermined coefficients $k_1$ to $k_r$. Thus the first group stores $k_1 a_1 \ldots k_1 a_q$ while the $r^{th}$ group stores $k_r a_1, \ldots, k_r a_q$.

By way of indication, these stored values are coded by eight bits, one of which is a sign bit.

The values $a_1$ to $a_q$ are those of the sines of all the possible different values, of the modulation phase $\zeta$ and the carrier phase $\theta$. These can easily be determined previously, and in the example considered, where the modulation phase jumps are multiples of $(\pi/4)$ and where the carrier phase is a multiple of $(\pi/2)$, all possible sums of $\zeta + \theta$ are also multiples of $(\pi/4)$.

The address in the memory of each registered value comprises, preferably, a word which is characteristic of the group to which this value belongs (hence the r possibilities $k_1$ to $k_r$) and a word which is characteristic of the sinusoidal value concerned (hence the q possibilities $a_1$ to $a_q$).

At each calculation period n.T, the address selection device 5 which operates at the frequency r.F receives successively the r values of the modulation phase $\zeta_{n-1}, \zeta_{n-2}, \ldots, \zeta_{n-r}$, and a data item concerning the value $\theta_n$ of the carrier phase, which remains the same throughout the calculation period. In the selection device 5, these data items are applied to a first sub-assembly 50 which determines in response thereto r words $m_1, m_2, \ldots, m_r$ which are characteristic in the memory of the sinusoidal values $\sin(\zeta_{n-1}+\theta_n)$, $\sin(\zeta_{n-2}+\theta_n), \ldots, \sin(\zeta_{n-r}+\theta_n)$ respectively. A particular embodiment of the sub-assembly 50 will be seen hereinbelow with reference to FIG. 2. The selection device 5 further comprises a second sub-assembly 51 which receives a signal at a rate C for selecting, sequentially during each calculation period, the r groups of values stored in the memory 4. The words $m_1$ to $m_r$ select the particular value to be read in the respective ones of the r groups. The second sub-assembly 51 can be constituted for example by a simple counter controlled by the clock signal C at the elementary frequency r.F to advance by one unit during each elementary period, this counter being reset to zero at the beginning of each calculation period.

Under the control of the selection device 5, the memory 4 thus delivers successively, during each calculation period, the values $k_1 \cdot \sin(\phi_{n-1}+\theta_n)$, $k_2 \cdot \sin(\zeta_{n-2}+\theta_n), \ldots, k_r \cdot \sin(\phi_{n-r}+\theta_n)$. These values are applied to an accumulator 7 which sums these values and which is reset to zero at the end of each calculation period, by a signal Z supplied at the frequency of 7200 Hz.

In practice, the value 0 is not registered in the memory 4 and the $i^{th}$ (i varying between 1 and r) group of stored values comprises, in the example considered, only four values $\pm k_i$, $\pm k_i \cdot \sqrt{(2/2)}$. The value 0 is advantageously introduced by means of a signal applied to a blocking input of the accumulator 7 and processed by the selection device 5, for blocking the accumulator 7 during each elementary period j of each calculation period n.T, for which the sum $\phi_{n-j}+\theta_n$ is zero (modulo $\pi$). During such an elementary period j, whatever the value delivered by the memory may be, the contents of the accumulator 7 is thus not modified and the result is thus effectively the same as if the value 0 had been added to its contents.

The values sent out successively by the accumulator 7 at the successive calculation periods define in digital form the wave M. Indeed, the value, which is $A_N$, delivered at the $n^{th}$ calculation period is equal to:

$$\sum_{i=1}^{r} k_i \cdot \sin(\phi_{n-i} + \theta_n),$$

which, developing the sine, can be written as:

$$\sum_{i=1}^{r} k_i \cdot (\sin\phi_{n-i} \cdot \cos\theta_n + \cos\phi_{n-i} \cdot \sin\theta_n),$$

with $\sigma_n$ independent of $i$:

$$(\sum_{i=1}^{r} k_i \cdot \sin\phi_{n-i}) \cdot \cos\theta_n + (\sum_{i=1}^{r} k_i \cdot \cos\phi_{n-i}) \cdot \sin\theta_n$$

or, even:

$$(\sum_{i=1}^{r} k_i \cdot (\sin\phi)_{n-i}) \cdot (\cos\theta)_n + (\sum_{i=1}^{r} k_i \cdot (\cos\phi)_{n-i}) \cdot (\sin\theta)_n$$

In this latter expression, it will be seen that the result obtained at the output of the accumulator 7 is the same as that which would have been obtained by determining digitally a wave whose frequency was zero modulated by the train D, in the form of two quadrature components (sin $\phi$)$_n$ and (cos $\phi$)$_n$; by applying each of these components to a non-recursive low-pass filter of the same type as that described in the preamble of the present specification and which would have $r$ delay circuits associated with $r$ weighting coefficients $k_1$ to $k_r$, respectively and by effecting a transposition of the modulated and filtered wave by the carrier P defined in the form of two quadrature components. Subsequently, the device which has been described with reference to FIG. 1 therefore effectively enables the obtaining of a wave modulated by the train D, centred about the frequency $f$ and free from modulation residues, the number $r$ and the values of the coefficients $k_1$ to $k_r$ being determined so that if they were used in a conventional non-recursive low-pass filter, the latter will comply with a given characteristic.

It will be observed here that, where as in a conventional filter, it would have been necessary to memorize, to form the delay line, values of sines coded by eight bits, the invention makes it possible to memorize values coded on only three bits. As the number $r$ of unitary delays which the line introduces is relatively great, it can be in the order of several tens, the saving of storage space is great.

By way of indication, in the example of application which has been described, 55 coefficients are used and it has been found more advantageous in that case to choose as an elementary frequency 64.F instead of 55.F.

FIG. 1 shows again a digital-to-analog converter 8 placed at the output of the accumulator 7 to convert the sequence of values $A_n$ into an analog signal which is then processed in an analog low-pass filter 9 which eliminates the high frequencies due to the sampling and delivers a wave M' which is suitable for applying to a telephone line for example.

A particular embodiment of the sub-assembly 50 will be described in detail hereinbelow with reference to FIG. 2.

Each group $i$ of the memory 4 comprising, as has been seen, four values, $\pm k_i$, $\pm k_i \cdot (2/2)$, only one two-bit word $m_i$ namely ab, is needed for selecting one of these values inside this group. The following correspondence is advantageously chosen:

Table I

| $m_i$ (ab) | Value stored at address $m_i$ in the $i^{th}$ group |
|---|---|
| 00 | $k_i$ |
| 01 | $k_i \cdot \frac{\sqrt{2}}{2}$ |
| 10 | $-k_i$ |

Table I-continued

| $m_i$ (ab) | Value stored at address $m_i$ in the $i^{th}$ group |
|---|---|
| 11 | $-k_i \cdot \frac{\sqrt{2}}{2}$ |

The values of the modulation phase delivered by the delay line 2 are expressed as multiples of ($\pi/4$) and coded on three bits, namely xyz, which represent, in this order, the binary value of the multiplying factor.

The data concerning the phase of the carrier which assumes successively the values 0, ($\pi/2$), $\pi$, 3($\pi/2$), 0, ($\pi/2$), $\pi$, 3($\pi/2$), ..., etc., is advantageously coded on two bits XY according to the following rule:

Table II

| XY | $\sigma_n$ |
|---|---|
| 10 | 0 |
| 00 | $\frac{\pi}{2}$ |
| 11 | $\pi$ |
| 01 | $3\frac{\pi}{2}$ |

The bits X and Y which are delivered by the source 6 according to FIG. 1 thus change value, the first for each calculation period and the second for every other calculation period. The source 6 can therefore simply have two frequency dividers by two connected in series, the first receiving a clock signal at 7200 Hz.

The first sub-assembly 50 which receives both the bits xyz and the bits XY derives the bits ab and the signal B applied to the accumulator 7, according to the following rule of correspondence, presented in the form of a Karnaugh table in which the symbol "-" shows an optional (don't care) state and in which the output variables are given in the order ab, B:

Table III

| xyz<br>XY | 000 | 001 | 011 | 010 | 110 | 111 | 101 | 100 |
|---|---|---|---|---|---|---|---|---|
| 00 | 00.0 | 01.0 | 11.0 | —.1 | —.1 | 01.0 | 11.0 | 10.0 |
| 01 | 10.0 | 11.0 | 01.0 | —.1 | —.1 | 11.0 | 01.0 | 00.0 |
| 11 | —.1 | 11.0 | 11.0 | 10.0 | 00.0 | 01.0 | 01.0 | —.1 |
| 10 | —.1 | 01.0 | 01.0 | 00.0 | 10.0 | 11.00 | 11.0 | —.1 |

Figure 2:
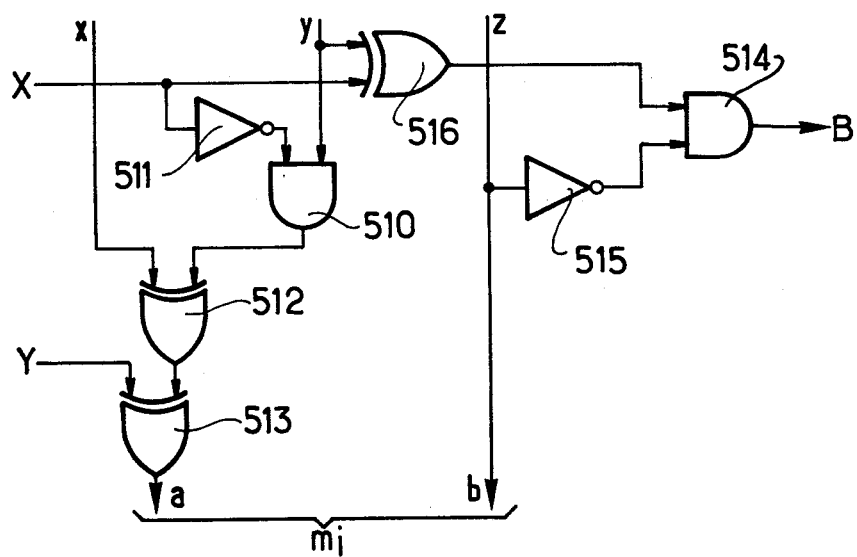
FIG. 2 is a logic circuit diagram of an element of the equipment shown in FIG. 1.

To do this, the first sub-assembly 50, shown in FIG. 2, has a first AND gate 510 which receives on a first input the bit $y$ and on a second input the bit X inverted by an inverter 511. The output of the first AND gate 510 is connected to a first EXCLUSIVE OR gate 512 which also receives the bit $x$ and whose output is connected to a second EXCLUSIVE OR gate 513 to which the bit Y is also applied. The bit $a$ of the word $m_i$ is supplied at the output of the EXCLUSIVE OR gate 513 while the second bit $b$ of $m_i$ is equal to the input bit $z$.

The signal B is obtained at the output of an AND gate 514 which receives on a first input the bit $z$ inverted by an inverter 515 and which has a second input connected to the output of a third EXCLUSIVE OR gate 516 which receives both the bit $y$ and the bit X.

A particular example of embodiment of the invention has been described but it is evident that modifications could be made thereto and/or that some means could be replaced by others which are technically equivalent. More particularly, it would be possible to pre-register only the set of sinusoidal values in the memory 4; the latter would then have at the output a multiplier controlled by the second sub-assembly 51 of the selection device 5 for multiplying the values successively read at each calculation period under the control of the first sub-assembly 50 by the coefficients $k_1$ to $k_r$ respectively. It would also be possible, instead of blocking the accumulator 7 to reset to zero the output register of the memory 4 each time the value zero is to be added in the accumulator 7. The delay line 2 could be constituted by an addressable memory for which a writing control circuit and a reading control circuit should be provided.

Moreover, although a preferred embodiment of the invention has been described, it would be possible to generate in a first phase a modulated and filtered wave, centred about zero frequency and subsequently to effect a transposition. In this case, the data concerning the value of the phase of the carrier applied to the selection device 5 would always be zero and the memory 4 would be capable of delivering at each calculation period two series of $r$ values, the one concerning the sine function and the other concerning the cosine function. These two series of values would be applied to the accumulator 7 through a multiplier which would multiply them respectively by two quadrature components of the transposition wave. By means of the particular filtering technique according to the invention, in which delays are applied to phase values coded on a restricted number of bits rather than to sinusoidal values coded on a substantially greater number of bits, such a device would remain generally more simple than the known devices mentioned in the preamble.

What is claimed is:

1. Device for generating an output wave which is phase modulated and which is free from unwanted modulation products, said device receiving at a first frequency digital values representing the modulation phase to be applied to a carrier wave, and generating said output wave in the form of a sequence of digital values delivered at a second frequency, said device comprising:
   a source for delivering, at said second frequency, digital values representing the phase of the carrier wave to be modulated,
   delay means receiving said digital values representing the modulation phase for sampling them at said second frequency and for delivering, at each period of said second frequency, the digital values representing the modulation phase relative to the $r$ preceding periods of said second frequency,
   a memory for storing $r$ groups of digital values, corresponding to a given set of sinusoidal values multiplied by $r$ predetermined coefficients $k_1$ to $k_r$, respectively,
   address selection means for addressing said memory, said selection means being connected to said delay means and to said source for determining, at each period of said second frequency, $r$ data items representative of the $r$ respective sums of the values of the modulation phase for the $r$ preceding periods and the value of the phase of the carrier for said each period, said memory delivering, in response to said $r$ data items, $r$ sinusoidal values corresponding to said $r$ sums, multiplied respectively by $k_1$ to $k_r$, and
   adding means for adding, on each period of said second frequency, the $r$ values delivered by said memory,
   said coefficients $k_1$ to $k_r$ being equal to the weighting coefficients of a low-pass non-recursive filter having a given frequency response.

2. A device according to claim 1, characterized in that said selection means comprises means for processing a signal which is representative of zero or non-zero, to within $\pi$, of the sums of the values of the modulation phase and of the value of the carrier phase; and means for applying this signal to said adding means, so as to block the addition each time one of the sums is zero.

3. A device according to claim 1, characterized in that said second frequency is equal to four times the frequency of the carrier wave.

4. A device according to claim 1, characterized in that the values of the $r$ groups are preregistered in the memory at addresses each formed by two words, one of which words characterizes the group and the other of which characterizes the sinusoidal value concerned, and in that the selection means comprises two sub-assemblies, one of which is controlled by a rhythm signal for selecting sequentially, each at said second frequency, the $r$ groups, and the other of which receives, at each sampling period of said second frequency, the $r$ data items on the modulation phase delivered by the delay line and the data item concerning the phase of the carrier, to select the value to be read in each of the $r$ groups.

5. A device according to claim 4, characterized in that said second frequency is equal to four times the frequency of the carrier wave.

6. A device according to claim 4, characterized in that said selection means comprises means for processing a signal which is representative of zero or non-zero, to within $\pi$, of the sums of the values of the modulation phase and of the value of the carrier phase; and means for applying this signal to said adding means, so as to block the addition each time one of the sums is zero.

7. A device according to claim 6, characterized in that said second frequency is equal to four times the frequency of the carrier wave.

* * * * *